UNITED STATES PATENT OFFICE.

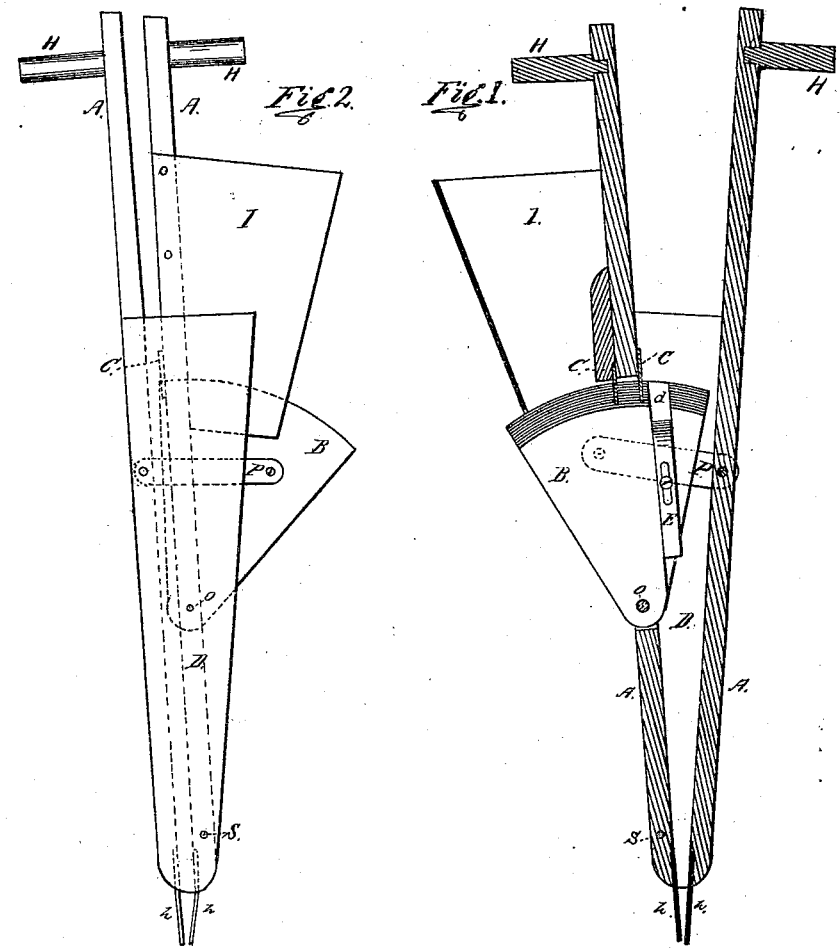

HENRY GORTNER, OF FRAZEYSBURG, OHIO.

IMPROVEMENT IN CORN-PLANTERS.

Specification forming part of Letters Patent No. 132,824, dated November 5, 1872.

*To all whom it may concern:*

Be it known that I, HENRY GORTNER, of Frazeysburg, in the county of Muskingum and State of Ohio, have invented certain Improvements in Hand Corn-Planters; and do hereby declare that the following is a full, clear, and exact description thereof, reference being had to the accompanying drawing and letters of reference marked thereon making a part of this specification.

In the following description of the machine, reference is had to the annexed drawing, in which Figure 1 represents the machine open and the dropper drawn out, and without hopper and inclosing-plates. Fig. 2 shows the machine closed up, with all parts attached.

A A represent the staves or main pieces, to which the handles H H, inclosing-plates D D, and points $h\ h$ are attached. The dropper B, Figs. 1 and 2, is pivoted at O. This is a triangular piece, the top of which is a segment of a circle and beveled at an incline of about forty-five degrees, having an inclined recess or sink, $d$, for the reception of the grain, and a gage, $e$, for making said recess larger or smaller. The dropper B works through one stave and the bottom of the hopper I, as shown in Figs. 1 and 2, so that when the machine is closed at the top the recess is inside the hopper and fills with the seed, and when the machine opens the recess is drawn out between the staves, and the seed is discharged. The plates D D form the connection between the staves A A, forming a hinge at S to allow the staves to open and close. They also, with the staves A A, form a tube when the machine is open to conduct the seed to the ground. C represents the rubber, which is of India rubber or other elastic material, which is placed over the dropper, on both sides of the stave through which the dropper works, for the purpose of scraping from the dropper any grain but what the recess will hold. P is a narrow plate pivoted to the dropper, and also to the stave at $p$, for the purpose of operating dropper.

The use of handles H H, points $h\ h$, and hopper I is sufficiently obvious.

What I claim as new, and desire to secure by Letters Patent, is—

In a hand corn-planter, the pivoted triangular dropper B, with its upper circle beveled on one side and provided with the adjustable gage E, substantially as specified.

HENRY GORTNER.

Witnesses:
D. M. THOMPSON,
C. G. THOMPSON.